United States Patent
Dos Santos et al.

(10) Patent No.: US 8,864,138 B2
(45) Date of Patent: Oct. 21, 2014

(54) SEALING SYSTEM WITH ANNULAR BRUSH SEAL

(75) Inventors: Nelson Dos Santos, Champigny sur Marne (FR); Dominik Igel, Hericy (FR); Gerard Philippe Gauthier, Champagne sur Seine (FR)

(73) Assignee: SNECMA, Paris (FR)

( * ) Notice: Subject to any disclaimer, the term of this patent is extended or adjusted under 35 U.S.C. 154(b) by 419 days.

(21) Appl. No.: 13/299,669

(22) Filed: Nov. 18, 2011

(65) Prior Publication Data

US 2012/0126484 A1     May 24, 2012

(30) Foreign Application Priority Data

Nov. 24, 2010 (FR) ...................................... 10 59699

(51) Int. Cl.
    *F01D 11/02*        (2006.01)
    *F16J 15/32*        (2006.01)

(52) U.S. Cl.
    CPC .................................. *F16J 15/3288* (2013.01)
    USPC ......................................................... 277/355

(58) Field of Classification Search
    CPC ............................... F16J 15/3288; F01D 11/22
    USPC .............................. 277/355; 415/173.2, 174.1
    See application file for complete search history.

(56) References Cited

U.S. PATENT DOCUMENTS

| | | | | |
|---|---|---|---|---|
| 5,316,318 A | * | 5/1994 | Veau ............................... | 277/355 |
| 6,027,121 A | * | 2/2000 | Cromer et al. ................. | 277/347 |
| 6,161,836 A | * | 12/2000 | Zhou .............................. | 277/355 |
| 7,578,509 B2 | * | 8/2009 | Grondahl ....................... | 277/355 |
| 8,474,827 B2 | * | 7/2013 | Grondahl et al. ............. | 277/411 |
| 2008/0258403 A1 | * | 10/2008 | Beichl et al. .................. | 277/355 |

FOREIGN PATENT DOCUMENTS

| | | |
|---|---|---|
| CA | 2 223 156 | 11/2005 |
| WO | WO 03/091609 A1 | 11/2003 |

OTHER PUBLICATIONS

French Preliminary Search Report issued Jul. 12, 2011, in French 1059699, filed Nov. 24, 2010 (with English Translation of Categories of Cited Documents).

* cited by examiner

*Primary Examiner* — Kristina Fulton
*Assistant Examiner* — Nathan Cumar
(74) *Attorney, Agent, or Firm* — Oblon, Spivak, McClelland, Maier & Neustadt, L.L.P.

(57) ABSTRACT

The invention concerns a system for providing a seal between two volumes (V1, V2) delimited by a part (2A) mounted to rotate about an axis (A) and a stator (6), said system (S) including an annular brush seal (7) that comprises:
    a brush body (8) pivotally mounted in the stator; and
    fibers (10) fixed to the brush body and inclined at an angle α relative to a plane (P) orthogonal to the rotation axis (A),
wherein it includes means (11, 12) for adjusting the angle α of the fibers (10) so as to be able to adjust precisely the clearance between the free end (10A) of the fibers and the rotary part (2A).

11 Claims, 2 Drawing Sheets

# SEALING SYSTEM WITH ANNULAR BRUSH SEAL

TECHNICAL FIELD

The present invention concerns a system for providing a seal between two gas volumes at different pressures situated around a rotary part.

In particular, the present invention is particularly well suited, although not exclusively so, to sealing problems encountered in an aircraft jet engine.

BACKGROUND

This kind of jet engine generally comprises from the upstream end to the downstream end in the direction of flow of the gases a fan, one or more compression stages, for example a low-pressure compressor and a high-pressure compressor, a combustion chamber, one or more turbine stages, for example a high-pressure turbine and a low-pressure turbine, and a gas exhaust pipe. To each compressor there may correspond a turbine, the two being connected by a part, thus forming a high-pressure body and a low-pressure body, for example.

The jet engine has at the upstream end and at the downstream end bearing enclosures containing rolling bearing and gear members lubricated with oil. Oil thrown off by these rotating parts forms a mist (or suspension) of droplets in suspension in the corresponding volume of the enclosures. Moreover, a flow of gas (air) passes through them, notably for ventilation purposes.

The upstream and downstream enclosures are formed and delimited by walls of the fixed structure of the jet engine and also by walls of rotary elements. They must allow the passage of a flow of gas but must retain as much oil as possible inside them, which is why the seal between the fixed elements and the rotary elements of an oil enclosure is a particularly difficult problem.

In a known manner, sealing is provided by means of labyrinth seals, i.e. seals formed by lips fastened to a rotary part and an abradable material fastened to a fixed part facing the lips. A clearance is maintained between these lips and the fixed part to allow the passage of a flow of gas coming from the low-pressure or high-pressure compressors; these gases oppose the exit of oil via the labyrinth seal; their flow rate is determined so as to be sufficient when idling and is therefore high in other flight phases (in which the flow rate of air aspirated by the fan of the jet engine is higher). This high flow in the other flight phases has at least two harmful consequences: firstly it commensurately reduces the efficiency of the engine and secondly it tends to entrain a greater quantity of air contaminated with oil to be treated by oil removers.

Replacing labyrinth seals with "brush" seals has therefore been envisaged, the latter including a plurality of juxtaposed substantially radial fibers fixed to a fixed part and the free ends of which are in contact with (or very close to) a rotary part, the fibers preferably being slightly inclined in the rotation direction of the rotary part; the fibers of the brush seal may be carbon fibers, for example.

Such brush seals have the advantage of requiring, to guarantee their oil-tightness, a flow of gas passing through them at a flow rate that is not excessive. However, the rubbing of the fibers on the track on the rotary part adapted to be in contact with their ends causes them to wear and thus also reduces their efficacy over time. Such wear is accentuated if there is an imbalance of the rotary part (the center of mass thereof not being on the rotation axis).

To alleviate this drawback, the document EP-0567392-B1 (of which the Applicant is the patentee) discloses a brush seal that comprises an annular brush body constituted of two flanges and mounted in the stator and fibers fixed by a first end into the brush body so as to be inclined relative to the axis of the rotary part and oriented toward the latter so that their second end is flush with the part to create a sealed curtain between the two annular volumes.

Moreover, the brush body is constituted of a plurality of ring sectors mounted in the stator, to allow slight automatic movement of the fibers away from the rotary part by becoming inclined relative to the axis of the part to allow eccentricity of the part relative to the stator (resulting from an imbalance, for example) at the same time as providing the seal between the two annular volumes.

In designing the brush body, each annular sector has a head at a first end that is mounted in a cylindrical groove of the stator.

The sectors are advantageously held in place by an elastic ring tensioned against a second end of the brush body opposite the head to hold the sectors of the brush body tightly together in a rest position in which the fibers have the smallest possible inclination relative to a radial plan of the axis of the rotary part.

SUMMARY

An object of the present invention is to improve the seal produced by means of a brush seal of the aforementioned type.

To this end, the system of the invention for providing a seal between two volumes delimited by a part mounted to rotate about an axis and a stator, said system including an annular brush seal that comprises:
  a brush body pivotally mounted in the stator; and
  fibers fixed to the brush body and inclined at an angle $\alpha$ relative to a plane orthogonal to the rotation axis,
is noteworthy in that it includes means for adjusting the angle $\alpha$ of the fibers so as to be able to adjust precisely the clearance between the free end of the fibers and the rotary part.

Accordingly, thanks to the invention, the value of the angle of inclination $\alpha$ of the fibers may be adjusted by intentional action (for example automatically or by a maintenance operative) to an appropriate predetermined value to fill a clearance formed between the rotary part and the free end of the fibers as a result of wear and thus to limit the flow rate of air through the brush seal.

If the rotary part and the stator are components of a jet engine, for example, the initial inclination $\alpha$ of the fibers of a new brush seal may be progressively reduced by successive interventions by an operative during operation of the jet engine in order to maintain an adequate minimum clearance between the free end of the fibers and the facing rotary part. In other words, by successive adjustment of the inclination of the fibers it is possible to increase the service life of a brush seal at the same time as ensuring an appropriate flow rate of gas passing through it.

In one embodiment of the invention the adjustment means include inclination members mounted on and firmly fastened to the brush body and associated with respective pressure members adapted to act on said corresponding inclination members to modify the inclination of the fibers.

Alternatively, the adjustment means could include only pressure members (i.e. no inclination members) adapted to act directly on the brush body of the seal to modify the inclination of the hairs. In this case, the brush body of the annular seal would serve as an inclination member.

The inclination members and the corresponding pressure members are preferably distributed, for example regularly distributed, around a circumference of the brush seal.

Thus it is possible to modify the angle of inclination $\alpha$ differently around the same circumference of the seal, notably if the clearance between the rotary part and the seal is not the same all around the latter. In other words, the existing clearance may be modified at just one particular angular portion or at a plurality of particular angular portions.

Obviously, the angle of inclination may equally be modified identically along the same circumference.

In one embodiment of the invention:
  each inclination member takes the form of a projecting tongue; and
  each pressure member takes the form of a screw the free end of which is adapted to come into contact with the corresponding inclination member firmly fastened to the brush body to modify the angle $\alpha$.

In particular, the length of the tongues may be determined to facilitate twisting of the seal by limiting the forces exerted on the latter.

In one embodiment of the invention the pressure members are mounted on the stator so as to be able to operate on the corresponding inclination members of the brush body, the latter being housed in a complementary groove provided in the wall of the stator.

The brush body of the brush seal is preferably formed from a deformable material adapted to accept the forces imposed by the means for adjusting the angle $\alpha$.

The present invention further concerns an aircraft engine including at least one sealing system of the type referred to above.

BRIEF DESCRIPTION OF THE DRAWINGS

The figures of the appended drawings show how the invention may be put into practice. In these figures, identical references designate similar elements.

DETAILED DESCRIPTION

Figure 1:
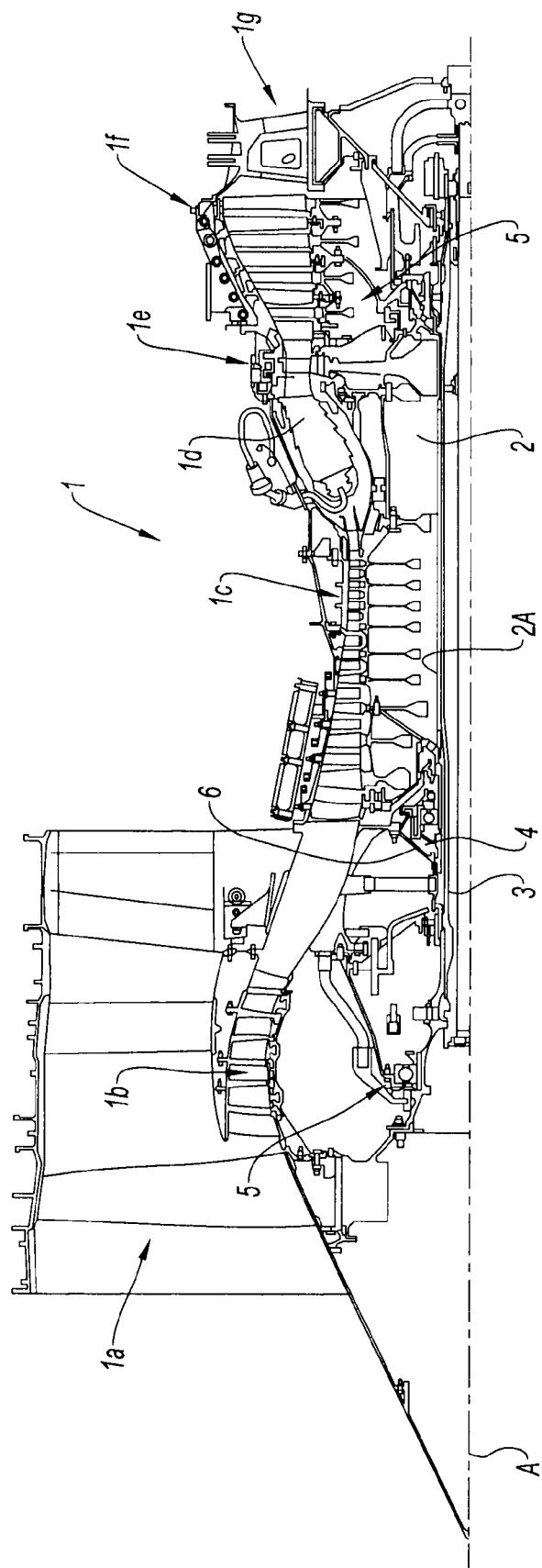
FIG. 1 is a diagrammatic general view in axial section of a jet engine of the invention.

FIG. 1 shows a jet engine 1 of the invention which conventionally includes a fan 1a, a low-pressure compressor 1b, a high-pressure compressor 1c, a combustion chamber 1d, a high-pressure turbine 1e, a low-pressure turbine 1f and an exhaust pipe 1g. The high-pressure compressor 1c and the high-pressure turbine 1e are connected together by a drum 2 extended in the upstream direction by an envelope 2A and together form a high-pressure body. The low-pressure compressor 1b and the low-pressure turbine 1f are connected by a low-pressure shaft 3 and with it form a low-pressure body.

The jet engine 1 includes static (fixed) members and rotary members forming in a known manner the various functional elements referred to above.

The jet engine 1 has at the upstream and downstream ends bearing enclosures 4, 5 containing rolling bearing and gear members lubricated with oil. These enclosures 4, 5 are conventionally referred to by the person skilled in the art as oil enclosures 4, 5 because they contain a suspension of oil droplets.

The jet engine 1 extends globally along an axis A that is the rotation axis of its rotary members and in particular the axis of the low-pressure shaft 3 and the envelope 2A. In the remainder of the description, concepts such as longitudinal, radial, internal or external are relative to this axis A.

Hereinafter, the invention is described by way of illustrative example with reference to the upstream enclosure 4, but it goes without saying that it applies equally to other upstream enclosures or downstream enclosures 5 and more generally to any other enclosure containing or accommodating members and a suspension of oil for lubricating them.

The upstream enclosure 4 defines an interior annular volume V1 (FIG. 2) delimited by walls of fixed members and rotary members. It is notably delimited internally by a portion of the rotary envelope 2A and at the upstream end by a casing 6 (shown in part) firmly fastened to the fixed structure of the jet engine 1.

Moreover, an annular volume V2 outside the enclosure 4 on its upstream side is also internally defined by the casing 6 at the upstream end and by a portion of the envelope 2A.

According to the invention, the engine 1 includes a system S adapted to provide the oil seal between the two annular volumes V1 and V2. It comprises an annular brush seal 7 that is mounted between the envelope 2A and the casing 6.

The brush seal 7 includes a brush body 8 pivotally mounted in a corresponding groove 9 produced in the wall of the casing 6 facing the envelope 2A and fibers 10 fixed to the brush body 8 and inclined at an angle $\alpha$ relative to a plane P orthogonal to the rotation axis A.

Furthermore, the brush body 8 includes a head 8A of torus shape and two flanges 8B rigidly fastened thereto.

The head 8A of the body 8 is accommodated in the groove 9 and is retained therein by means of retaining members (not shown in the figures).

The fibers 10, which are carbon-based, for example, are for their part fixed to the brush body 8 by means of the two flanges 8B between which they are clamped.

In the example described, the brush seal 7 or to be more precise the brush body 8 is of deformable metal material so that it can be twisted (as symbolized by the arrows T in FIG. 2) with respect to its meridian circle Cm as described hereinafter.

The brush seal 7 includes means 11 and 12 for adjusting the angle of inclination $\alpha$ of the fibers 10 so that it is possible to obtain a particular clearance between the free ends of the fibers 10A and the rotary envelope 2A.

In the example described, the adjustment means include a plurality of inclination members 11 mounted on the brush body 8 (to be more precise on the head 8A thereof or on a flange 8B) and a plurality of pressure members 12 adapted to act on the corresponding inclination members 11 to modify the angle of inclination $\alpha$ of the fibers 10.

The pressure members 12 are disposed along an annular wall 13 of the upstream internal end part of the casing 6, the wall 13 forming part of the bottom of the groove 9.

Figure 2:
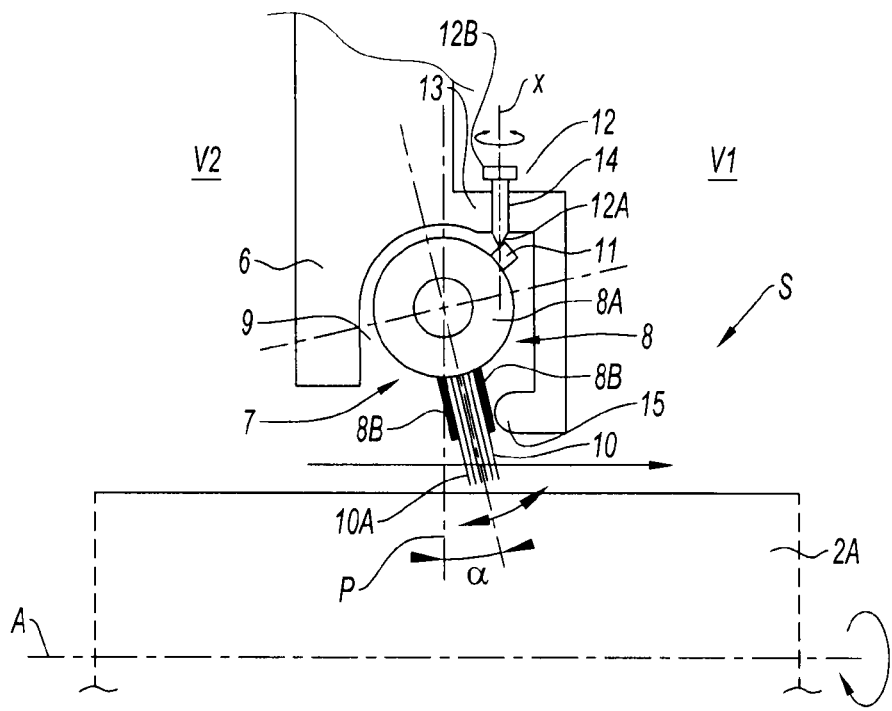
FIG. 2 shows diagrammatically in partial axial section a sealing system of one embodiment of the present invention.
Figure 3:
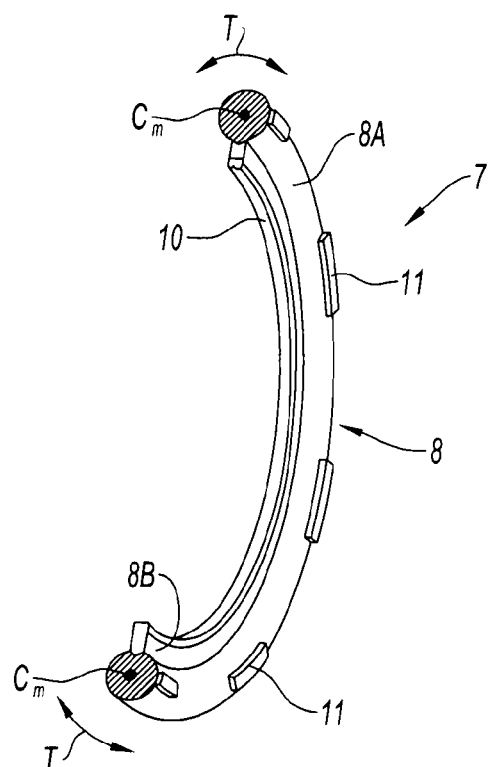
FIG. 3 shows diagrammatically in partial perspective the brush seal of the FIG. 2 sealing system.

In the example shown in FIGS. 1 and 2, the inclination members 11 and the corresponding pressure members 12 are distributed regularly around a circumference of the brush seal 7.

In particular, the inclination members 11 take the form of respective projecting annular tongues 11 with the result that a plurality of annular tongues 11 of particular length is distributed around the same circumference of the head 8A. Of course, the plurality of annular tongues could instead be replaced by a single annular tongue extending around a circumference of the head 8A.

Moreover, in this example, each pressure member 12 takes the form of a screw a free end 12A of which is adapted to come into contact with the corresponding facing tongue 11.

In particular, there is formed in the wall 13 a plurality of orifices 14 each associated with a screw 12 and the internal lateral surface of which is threaded so that the corresponding screw 12 may be screwed into it and project into the groove 9.

Each of the screws 12 further includes a head 12B by means of which a maintenance operative may adjust the inclination α of the fibers 10 of the brush seal 7, for example using an appropriate endoscope. In fact, by turning the screws 12 about a local axis X, the operative is able to modify the angle α by applying torsion to the brush body 8.

To facilitate adjustment of the screws 12 around the circumference of the seal 7 and to obtain exactly the same inclination α thereon markings (for example micrometer markings) may be disposed around each orifice 14 in the wall 13. Thus the operative would be able to apply a precise particular rotation to each of the screws 12.

Thanks to the invention, it is possible to modify differently the angle of inclination α around the same circumference of the seal 7, notably if the clearance between the rotary envelope 2A and the seal 7 is not identical over the whole of the latter. In other words, the existing clearance may be modified in one or more particular angular portions.

The homogeneous nature of the clearance between the envelope 2A and the free ends 10A of the fibers 10 depends on the number of pressure members 12 distributed around the seal 7. The more pressure members 12 there are, the more precisely the clearance may be adjusted along the seal 7.

Moreover, the operation of adjusting the clearance between the fibers 10 and the envelope 2A may advantageously be carried out on an aircraft on the ground without demounting the engine, which considerably reduces maintenance costs and the time for which the aircraft is immobilized on the ground.

It will moreover be noted that the groove 9 is delimited on the downstream side by a substantially axial wall that has a return in the upstream direction forming an abutment 15 at its internal end facing the envelope 2A. The function of the abutment 15 is to limit the maximum movement of the fibers 10 (and thus to define the maximum value of the angle α).

It will moreover be noted that the inclination members may instead be formed by one of the two flanges 8B of the brush body 8. In other words, in this case, the pressure members are pressed directly against the flange 8B facing which they are mounted to modify the angle of inclination α.

It goes without saying that the present invention is in no way limited to the embodiment described above. In fact, the pressure members taking the form of a ring accommodated in the wall of the stator 6 and adapted to come into contact with the tongues 11 of the brush body 8 over the whole of the circumference thereof could be envisaged, for example.

The invention claimed is:

1. A sealing system for providing a seal between two volumes delimited by a rotary part mounted to rotate about a rotation axis and a stator, said system comprising:
    an annular brush seal including
        a brush body pivotally mounted in the stator, and
        fibers fixed to a peripheral surface of the brush body and inclined at an angle α relative to a plane orthogonal to the rotation axis; and
    adjustment means for adjusting the angle of the fibers to adjust a clearance between a free end of the fibers and the rotary part, the adjustment means including
        inclination members that are mounted on and firmly fastened to the peripheral surface of the brush body so as to protrude radially from the peripheral surface, and
        pressure members that contact the inclination members to act respectively on corresponding inclination members to modify the angle of the fibers.

2. The sealing system claimed in claim 1, wherein the inclination members and the corresponding pressure members are distributed around a circumference of the brush seal.

3. The sealing system claimed in claim 2, wherein the inclination members and the corresponding pressure members are equally spaced in distribution around the circumference of the brush seal.

4. The sealing system claimed in the claim 1, wherein each inclination member is a projecting tongue; and
    wherein each pressure member is a screw having a free end thereof positioned so as to come into contact with a corresponding inclination member firmly fastened to the brush body and thereby modify the angle.

5. The sealing system claimed in the claim 1, wherein the pressure members are mounted on the stator so as to engage the corresponding inclination members of the brush body, the brush body being housed in a complementary groove provided in a wall of the stator.

6. The sealing system claimed in the claim 1, wherein the brush body of the brush seal includes a deformable material adapted to accept forces imposed by the adjustment means for adjusting the angle.

7. An aircraft engine including at least one sealing system as claimed in claim 1.

8. An apparatus comprising:
    an annular brush seal including
        a brush body pivotally mounted in a stator, and
        fibers fixed to a peripheral surface of the brush body and inclined at an angle α of extension of the fibers relative to a plane orthogonal to a rotation axis; and
    an adjustment device for adjusting a clearance between a free end of the fibers and a rotary part, the adjustment device including
        inclination members that protrude radially from the peripheral surface of the brush body, and
        pressure members that extend through a wall of the stator so as to respectively contact corresponding inclination members thereby modifying the angle of the fibers with respect to the rotary part, which rotates about the rotation axis.

9. The apparatus according to claim 8, wherein the wall of the stator, through which the pressure members extend, is disposed opposite the free end of the fibers.

10. The apparatus according to claim 8, wherein rotation in a first direction of the pressure members drives the pressure members toward a side of the inclination members so as cause the brush body to rotate about a pivot point and thereby drive the fibers toward the rotary part.

11. The apparatus according to claim 10, wherein rotation in a second direction of the pressure members allows the fibers of the brush body to rotate away from the rotary part.

* * * * *